(12) United States Patent
Mebarkia et al.

(10) Patent No.: US 8,721,222 B2
(45) Date of Patent: May 13, 2014

(54) LATERAL BUCKLING MITIGATION APPARATUS, METHODS AND SYSTEMS FOR USE WITH SUBSEA CONDUITS

(75) Inventors: Sid A. Mebarkia, Sugar Land, TX (US); Antonio C. F. Critsinelis, Kingwood, TX (US); Dane Drew, Houston, TX (US); Michael J. Quinney, Bellville, TX (US); Lynn Wang, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/289,759

(22) Filed: Nov. 4, 2011

(65) Prior Publication Data

US 2013/0115009 A1      May 9, 2013

(51) Int. Cl.
*F16L 57/02* (2006.01)
*F16L 1/16* (2006.01)
*B63B 22/18* (2006.01)
*F16L 1/26* (2006.01)

(52) U.S. Cl.
USPC ..... 405/168.2; 405/158; 405/171; 405/184.4; 405/154.1

(58) Field of Classification Search
USPC ........ 405/154.1, 158, 162, 171, 168.2, 184.4, 405/211, 216; 138/110, 149, 151, 156
See application file for complete search history.

(56) References Cited

U.S. PATENT DOCUMENTS

| | | | | |
|---|---|---|---|---|
| 320,771 A | * | 6/1885 | Ford | 285/373 |
| 924,262 A | * | 6/1909 | Moll | 138/99 |
| 1,079,758 A | * | 11/1913 | Gray | 248/55 |
| 1,574,211 A | * | 2/1926 | Taylor | 384/483 |
| 1,928,570 A | * | 9/1933 | Mustico | 138/99 |
| 2,749,155 A | * | 6/1956 | Kinghorn et al. | 285/5 |
| 2,770,475 A | * | 11/1956 | Rafferty | 285/94 |
| 2,900,795 A | * | 8/1959 | Brandt | 405/171 |
| 2,928,411 A | * | 3/1960 | Johnson | 137/236.1 |
| 3,313,358 A | * | 4/1967 | Postlewaite et al. | 175/7 |
| 3,379,027 A | * | 4/1968 | Mowell et al. | 62/50.7 |
| 3,603,617 A | * | 9/1971 | Lochridge | 285/24 |
| 3,734,138 A | * | 5/1973 | Brown et al. | 138/106 |
| 3,768,269 A | * | 10/1973 | Broussard et al. | 405/168.2 |
| 3,781,041 A | * | 12/1973 | Petzetakis | 285/111 |
| 3,916,500 A | * | 11/1975 | Brown | 29/240 |
| 3,961,490 A | * | 6/1976 | Corgnet | 405/202 |
| 4,088,089 A | * | 5/1978 | Flory | 114/230.14 |
| 4,128,219 A | * | 12/1978 | Kaigler et al. | 248/55 |
| 4,234,216 A | * | 11/1980 | Swanson et al. | 285/93 |
| 4,418,947 A | * | 12/1983 | Talafuse | 285/276 |
| 4,694,865 A | * | 9/1987 | Tauschmann | 138/148 |
| 5,018,903 A | * | 5/1991 | O'Donnell et al. | 405/170 |
| 5,518,340 A | * | 5/1996 | Hall et al. | 405/158 |
| 5,575,590 A | * | 11/1996 | Drost et al. | 405/166 |
| 5,711,639 A | * | 1/1998 | Tessier et al. | 405/171 |
| 5,722,340 A | * | 3/1998 | Sweetman | 114/243 |
| 6,004,072 A | * | 12/1999 | Cunningham | 405/170 |
| 6,171,025 B1 | * | 1/2001 | Langner et al. | 405/154.1 |
| 6,213,157 B1 | | 4/2001 | Thiebaud et al. | |

(Continued)

*Primary Examiner* — John Kreck
*Assistant Examiner* — Edwin Toledo-Duran
(74) *Attorney, Agent, or Firm* — Karen R. DiDomenicis (57) ABSTRACT

Disclosed are systems and methods for controlling lateral deformation and reducing axial displacement, also referred to as walking, of a subsea conduit such as a pipeline for conveying produced hydrocarbon fluids. The systems and methods include the installation of rolling assemblies on the conduit at predetermined locations. The rolling assemblies include elements for forming rolling modules rotatable with respect to the conduit. Also disclosed is a system for monitoring displacement of the conduit over time.

21 Claims, 12 Drawing Sheets

(56) References Cited

U.S. PATENT DOCUMENTS

| | | | | |
|---|---|---|---|---|
| 6,270,387 | B1 * | 8/2001 | Nesheim | 441/133 |
| 6,315,006 | B1 * | 11/2001 | Opperthauser | 138/149 |
| 6,450,736 | B1 * | 9/2002 | Eck et al. | 405/184.4 |
| 6,461,140 | B1 * | 10/2002 | Bosg et al. | 425/548 |
| 6,513,551 | B2 | 2/2003 | Louis et al. | |
| 6,817,808 | B1 * | 11/2004 | Patinet | 405/170 |
| 7,121,767 | B1 * | 10/2006 | Watkins | 405/216 |
| 7,214,114 | B2 * | 5/2007 | Gibson | 441/133 |
| 7,578,315 | B2 * | 8/2009 | Wilson | 138/149 |
| 7,660,496 | B2 * | 2/2010 | Roberts | 385/13 |
| 7,744,314 | B2 * | 6/2010 | Eide | 405/224.2 |
| 7,819,608 | B2 | 10/2010 | Joshi et al. | |
| 2002/0023782 | A1 * | 2/2002 | Appleton et al. | 175/325.3 |
| 2003/0068941 | A1 | 4/2003 | Oram | |
| 2005/0047871 | A1 | 3/2005 | Lee et al. | |
| 2005/0141967 | A1 * | 6/2005 | Giles et al. | 405/158 |
| 2006/0045408 | A1 * | 3/2006 | Jones et al. | 385/12 |
| 2006/0210361 | A1 | 9/2006 | Lamison | |
| 2008/0274656 | A1 * | 11/2008 | Routeau et al. | 441/133 |
| 2009/0185868 | A1 * | 7/2009 | Masters et al. | 405/216 |
| 2009/0313794 | A1 | 12/2009 | Denniel et al. | |

\* cited by examiner

LATERAL BUCKLING MITIGATION APPARATUS, METHODS AND SYSTEMS FOR USE WITH SUBSEA CONDUITS

FIELD

The present disclosure relates to systems and methods for reducing strain in subsea conduit such as offshore hydrocarbon production pipeline. The present disclosure further relates to rolling modules for attachment to subsea conduits. The present disclosure further relates to a system for monitoring displacement of a subsea conduit over time.

BACKGROUND

Pipeline in offshore hydrocarbon production is installed on the seabed, often spanning great distances. Hydrocarbon well fluids carried by such pipelines can occur at high temperatures, e.g., greater than about 80° C., even up to about 165° C. Pipeline carrying such high temperature fluids can experience thermal gradients across the pipeline during multiple production shut downs and start ups resulting in expansion, contraction, and thermal cycling of the pipeline or conduit. This can result in pipeline buckling, movement, and loading that lead to both static peak and cyclic stresses, which may induce overstrain and fatigue failures along the length of the pipeline at locations which are relatively vulnerable and prone to these failure mechanisms.

In current practice, buoyancy modules are attached to the exterior of hydrocarbon production pipeline in sections or groupings of individual buoyancy modules at locations determined analytically, such as by finite element analysis, in order to reduce the lateral resistance of the pipeline so that the pipeline can "buckle" in a smooth and controlled manner. In other words, the use of buoyancy modules facilitates the formation of an arc along the length of the pipeline in response to the stresses in the pipeline created by the thermal gradients. This results in the development of smoother and more benign deformation, and therefore less strain and fatigue on the pipeline, than would occur without the use of buoyancy modules.

During pipeline buckling, conventional buoyancy modules slide across the seabed in the lateral direction, undesirably resulting in soil compaction, increased lateral soil resistance and the formation of berms on the seabed. The berms create additional lateral resistance which diminishes the effectiveness of the buoyancy modules to alleviate the severity of pipeline buckling. This can result in increased stress on the pipeline, leading to the need for more frequent buoyancy sections. While more buoyancy may address the negative effect of berm formation and therefore assist in the control of buckling in the lateral direction, the pipeline is unfortunately made more vulnerable to displacement in the axial direction also referred to as "walking," because the pipeline is "lighter" and the axial resistance is diminished. Walking is a very costly problem, as the junction of the pipeline with elements of the production facility infrastructure, such as for example, the pipeline end termination (PLET) or other subsea equipment, can be overstressed, resulting in damage and even parting of the pipeline from the equipment. Such incidents often require that hydrocarbon production be shut down so that the pipeline system can be repaired. In order to prevent walking, expensive anchoring mitigation using large suction or driven piles and the like is often employed to hold the pipeline in place.

It would be desirable to have a solution to the aforementioned problems associated with the use of existing buoyancy modules which would control buckling of subsea pipeline, alleviate the effect of berm formation caused by lateral pipeline movement, reduce the incidence of pipeline walking, and reduce the need for pipeline anchoring.

SUMMARY

In one aspect, a rolling assembly is provided for installation on a subsea conduit. The assembly includes at least two rolling module elements attachable to one another to form a rolling module having a generally cylindrical shape having two ends and defining an internal cavity for receiving a subsea conduit such that when installed on the subsea conduit, the rolling module is rotatable with respect to the subsea conduit. The assembly further includes at least one clamp unit for installation on the subsea conduit. Each clamp unit is formed by a pair of semi-cylindrical clamp elements attachable to one another. Each clamp unit has a generally cylindrical shape and a clamp interior surface for surrounding and contacting the conduit such that when installed on the subsea conduit each clamp unit is fixed circumferentially and axially with respect to the subsea conduit.

In another aspect, a rolling assembly for installation on a subsea conduit includes at least two sleeve elements attachable to one another to form a cylindrical sleeve having two ends and defining an internal cavity having a sleeve interior surface for surrounding a subsea conduit such that when installed on a subsea conduit the cylindrical sleeve is fixed circumferentially and axially with respect to the subsea conduit. The assembly further includes at least two rolling module elements attachable to one another to form a rolling module having a generally cylindrical shape having two ends and defining an internal cavity having a rolling module interior surface for surrounding and contacting the cylindrical sleeve such that when installed around the cylindrical sleeve the rolling module is rotatable with respect to the cylindrical sleeve.

In another aspect, a system for conveying fluids on a seabed is provided. The system includes a conduit located on a seabed, and at least two rolling assemblies as described above installed on the conduit at predetermined locations.

In another aspect, the system further includes at least one sensor located in at least one of the at least two rolling assemblies for measuring relevant information such as distance displaced by the conduit over time.

In yet another aspect, a method is provided for controlling lateral deformation of a subsea conduit. The method includes installing at least two rolling assemblies as described above on a subsea conduit at predetermined locations.

BRIEF DESCRIPTION OF THE DRAWINGS

These and other objects, features and advantages of the present disclosure will become better understood with regard to the following description, appended claims and accompanying drawings where:

DETAILED DESCRIPTION

The present disclosure provides systems and methods utilizing rolling assemblies for controlling deformation or buckling of a subsea conduit, by which is meant a conduit that is located on a seabed.

The terms "conduit," "pipeline" and "pipe" are used herein interchangeably.

By "rolling module" is meant an apparatus configured to be mounted onto a conduit which is rotatable with respect to the conduit, such that rotation of the rolling module facilitates lateral movement of the conduit.

By "rolling assembly" is meant an assembly of components including the components which form the rolling module and accessories necessary for the function of individual rolling module embodiments.

By "rolling module section" is meant a grouping or series of adjacent multiple rolling modules installed on a conduit. The location of the rolling module section and the number of rolling modules within the section are determined analytically for a given pipeline system.

Rolling assemblies and rolling modules, to be described in detail hereinafter, are provided for installation on the subsea conduit at a predetermined location or multiple predetermined locations. The rolling modules of the present disclosure are able to rotate or roll with respect to the pipe on which they are installed. When installed on a pipe, the rolling modules allow the pipe to deform in a controlled manner in response to stresses imposed on the pipe, such as stresses induced by thermal cycling. Because the rolling modules are able to rotate, the rolling modules do not slide on the seabed when the pipeline moves laterally, therefore the pipeline can move laterally without significantly increasing lateral soil resistance, e.g. resulting from the formation of berms. As a result, fewer rolling modules and possibly shorter rolling module sections are required to be installed on a pipeline to successfully control buckling than are required using conventional buoyancy modules. As a consequence of using fewer rolling modules, incidence of pipeline walking and development of higher than tolerable stresses in the pipeline can be reduced or avoided, and fewer and less expensive anchoring means can be used.

Unlike conventional buoyancy modules for attachment to subsea conduit, the rolling modules of the present disclosure are rotatable with respect to the conduit. Therefore, the rolling modules can act as wheels to facilitate lateral movement of the conduit while overcoming friction between the rolling modules and the seabed.

Figure 1:
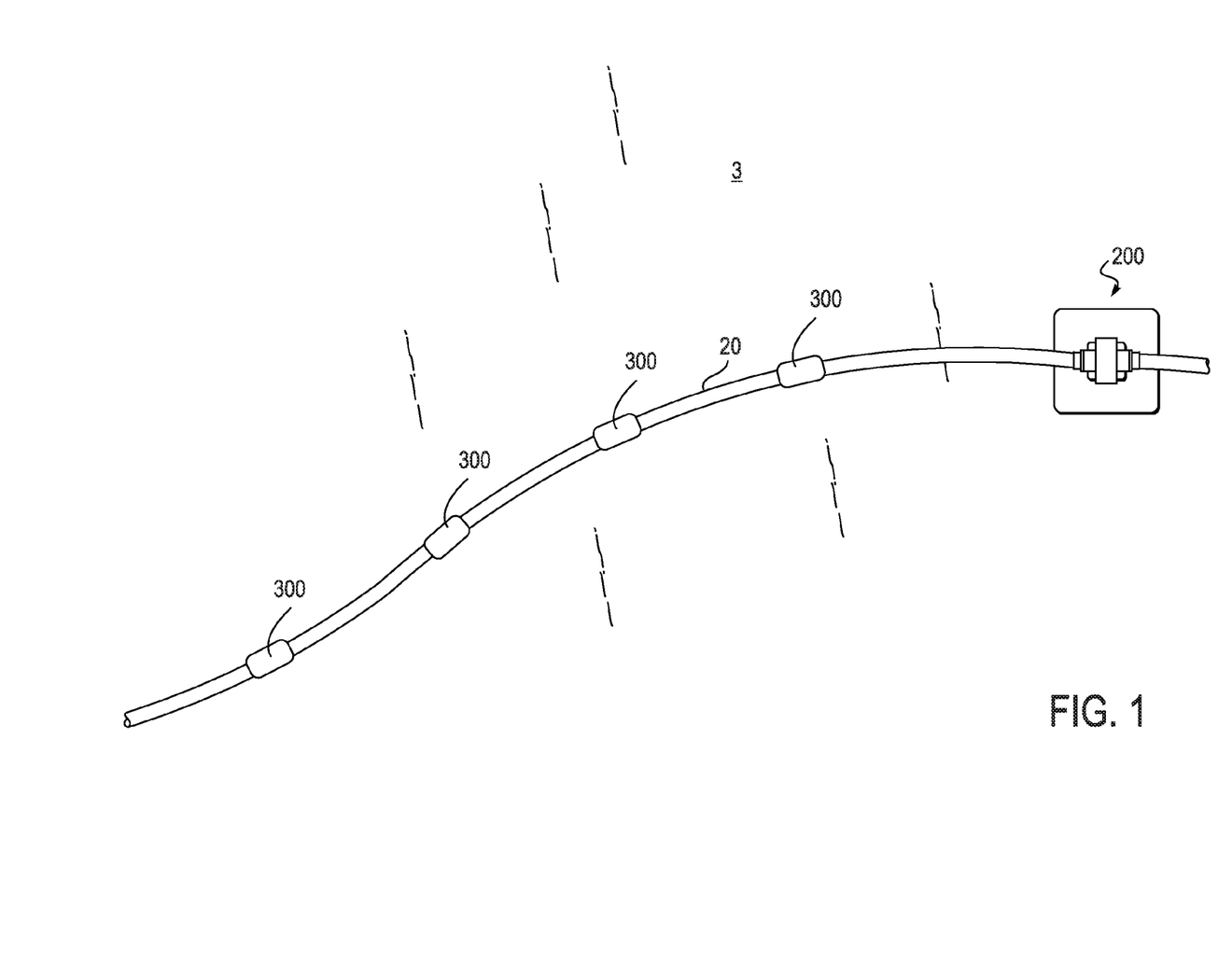
FIG. 1 is a top view of a system including a pipeline fitted with rolling module sections according to one embodiment.

FIG. 1 is a top view (i.e., viewed from an overhead perspective) of a system in which at least two rolling module sections 300 are installed on a subsea conduit 20 located on the seabed 3 at predetermined locations. Four rolling module sections 300 are installed in the pipeline system shown. The system illustrated further includes a pipeline end termination (PLET) 200. The rolling modules in the sections 300 help to ensure that smoother and less aggressive deformation in the form of arcing occurs along the length of the pipeline 20 on which the rolling modules are installed. This in turn reduces the likelihood that higher than tolerable stresses will develop in the pipeline in the vicinity of the rolling modules. The number of individual rolling modules in a given rolling module section will vary depending on the particular pipeline design. As nonlimiting examples, the number of rolling modules in a section can be about 10 to 40 but can change depending on the design requirements. The rolling modules are generally installed adjacent one another and spaced approximately 4 to 12 inches (10-30 cm) apart or spaced a distance determined by engineering analysis and installation requirements.

In one embodiment, a rolling assembly is provided for forming a rolling module for attaching to a subsea conduit. The assembly includes at least two elements attachable to one another to form a rolling module, having a generally cylindrical shape having two ends and defining an internal cavity for receiving the subsea conduit. As nonlimiting examples, the length of the rolling module can vary between approximately 3 and 7 feet (1-2 m). The assembly can include a pair of semi-cylindrical elements attachable to one another to form the module. Alternatively, the assembly can include three or more pieces attachable to one another to form the module. The module is rotatable with respect to the conduit. Various embodiments are described in more detail hereinafter.

In some embodiments, the assembly further includes at least two sleeve elements attachable to one another to form a cylindrical sleeve defining an internal cavity for receiving the subsea conduit. In such embodiments, the rolling module is rotatable with respect to the sleeve which is fixed circumferentially and axially with respect to the conduit. The sleeves can be formed from any suitable material, including, but not limited to, polyethylene, polypropylene, nylon, composite material and low friction material.

In some embodiments, the assembly further includes at least one clamp unit attachable to the conduit. In one embodiment, a pair of and clamp units is attached to the conduit proximate each end of the rolling module. Each clamp unit can be formed of a pair of semi-cylindrical end clamp elements attachable to one another to form a clamp unit having a generally cylindrical shape and having a clamp unit interior surface for surrounding and contacting the conduit. In such embodiments, the rolling module is rotatable with respect to the conduit and the clamp unit(s) is fixed circumferentially and axially with respect to the conduit. The clamp units can be formed from any suitable material, including, but not limited to, polyethylene, polypropylene, nylon, composite material and low friction material.

Figure 2:
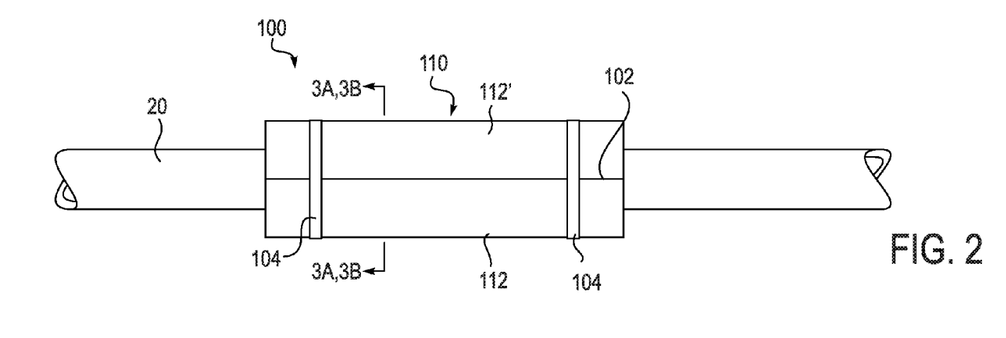
FIG. 2 is a side view of a rolling module installed on a section of pipe according to one embodiment.

Several alternative rolling module configurations are contemplated. In one exemplary embodiment, illustrated in FIG. 2, a pair of semi-cylindrical elements 112 and 112' are attached to one another to form a cylindrical rolling module 110. The rolling module 110 defines an internal cavity which receives conduit 20 when the module is installed on the conduit. In the embodiment shown in FIG. 2, the elements 112 and 112' are attached to one another and held in place around the conduit by a pair of bands 104. The elements can also be attached to one another by bolts. Between the elements 112 and 112' is a seam 102.

Figure 3A:
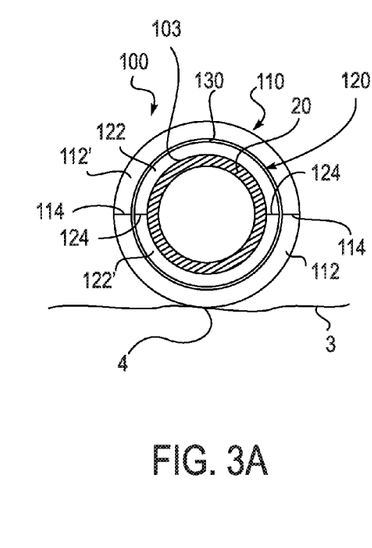
FIGS. 3A-C are cross-sectional views of a rolling module installed on a section of pipe at various rotational positions according to another embodiment.

FIG. 3A is a cross-sectional view of a combined rolling assembly 100 and conduit 20 according to one embodiment. The conduit is resting on the seabed 3, at a first contact point 4 between rolling module 110 and seabed 3. Surrounding the conduit 20 is a cylindrical sleeve 120 made up of a pair of semi-cylindrical sleeve elements 122 and 122'. The sleeve 120 is mounted onto the conduit 20 such that the sleeve cannot move axially or circumferentially with respect to the conduit 20. The interface 103 between the sleeve 120 and the conduit 20 is therefore fixed. Where the sleeve elements meet are inner sleeve seams 124. Surrounding the cylindrical sleeve 120 is the cylindrical rolling module 110, made up of elements 112 and 112'. Where the elements meet are the outer element seams 114. Between the rolling module 110 and the sleeve 120 is a slip zone 130 which provides sufficiently low friction between the rolling module 110 and the sleeve 120 such that the rolling module 110 can rotate relatively freely with respect to the sleeve 120. The slip zone 130 can be achieved in a number of ways depending on the specific embodiment. Different embodiments for slip zone 130 will be described in more detail hereinafter.

Figure 3B:
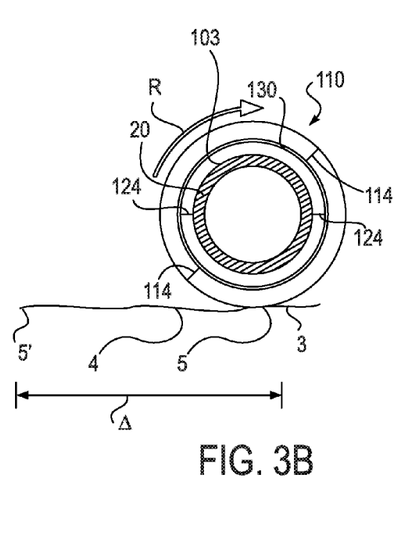
Figure 3C:
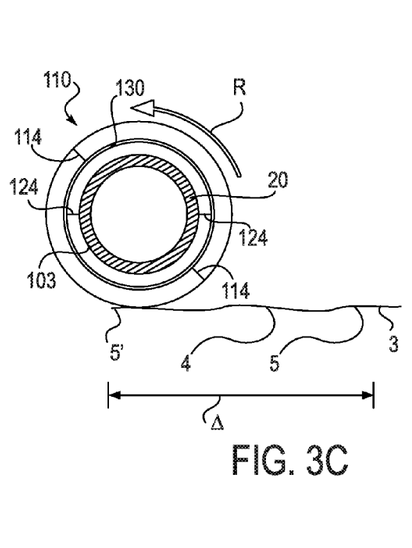

FIG. 3B shows the rolling assembly 100 and conduit 20 of FIG. 3A after having been rotated to the right to a second contact point 5. The direction of rotation is indicated by R. FIG. 3C shows the rolling assembly 100/conduit 20 after having been rotated to the left to contact point 5'. The amount of rotation can be seen by observing the relative positions of the outer buoyancy element seams 114 with respect to the inner sleeve seams 124. As can be seen from FIGS. 3B and 3C, the rolling assembly has been rotated less than one complete revolution, approximately 135°. In practice, there is no limit to the number of revolutions that the rolling assembly may rotate, and any distance of lateral displacement Δ is contemplated.

Figure 4A:
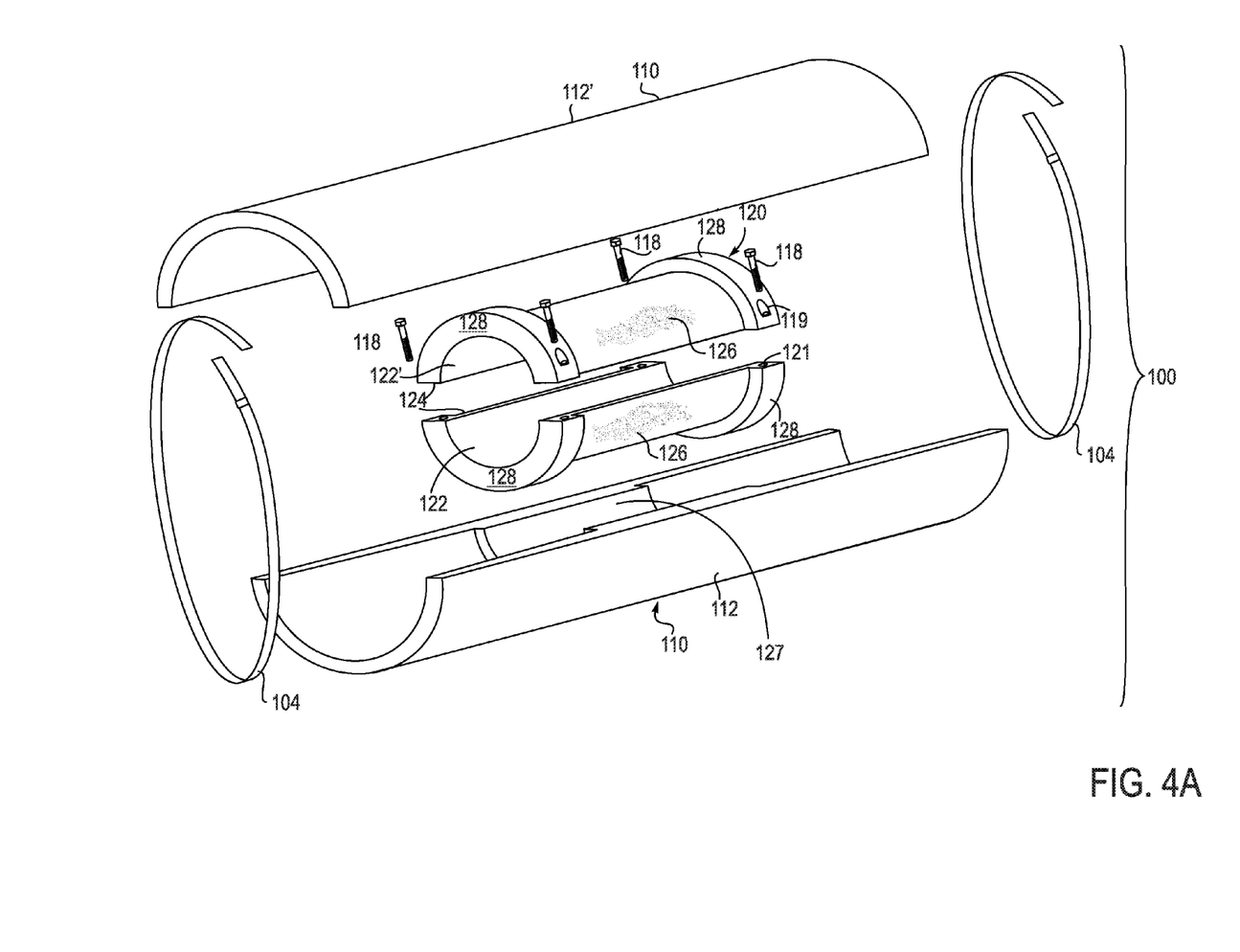
FIG. 4A is an exploded view of a rolling module and a cylindrical sleeve for installation on a section of pipe according to one embodiment.
Figure 4B:
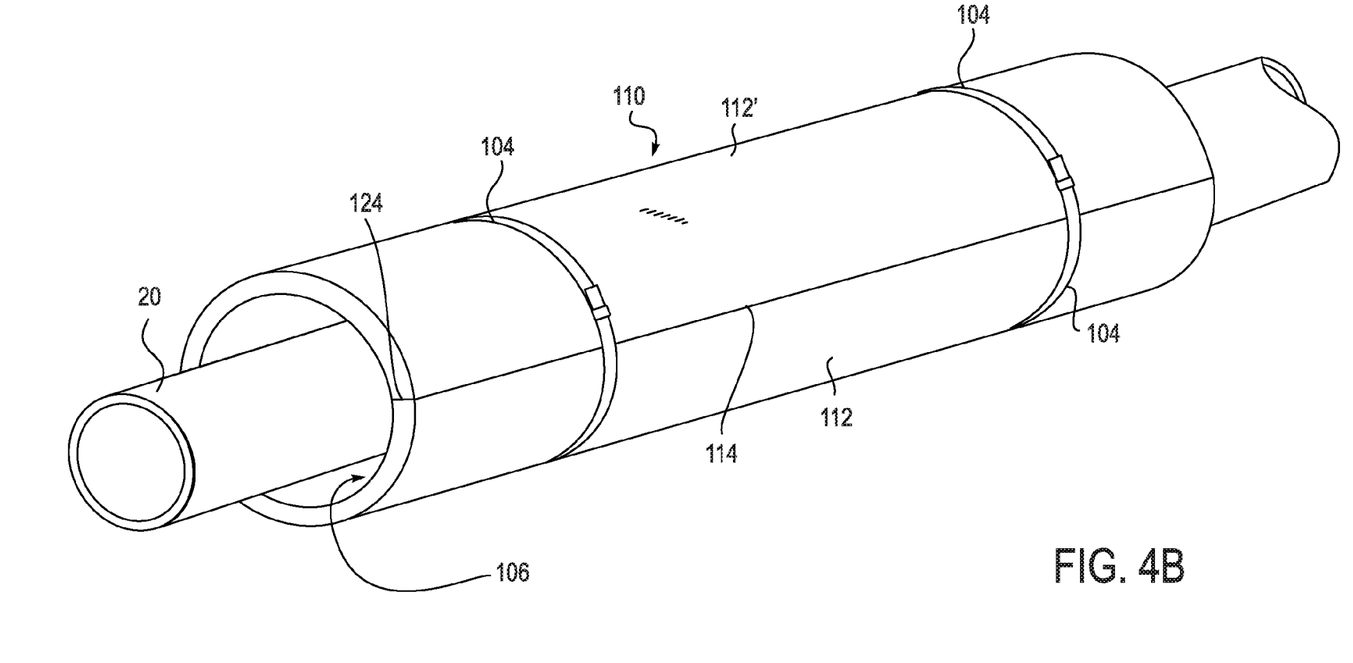
FIG. 4B is a perspective view of the rolling module and cylindrical sleeve of FIG. 4A as installed on a section of pipe according to another embodiment.

FIG. 4A is an exploded view of the rolling assembly 100 according to one embodiment showing the relative positions of the elements thereof. In the embodiment shown, two semi-cylindrical sleeve elements 122 and 122' are provided for attachment to one another to form cylindrical sleeve 120. Sleeve elements 122 and 122' are attached to one another by bolts 118 through holes 119 and 121. By bolting the sleeve elements to one another, the sleeve 120 is securely installed around a conduit (not shown) such that it is fixed circumferentially and axially with respect to the conduit. Flanges 128 which are integral to the sleeve elements 122 and 122' are positioned at either end of the sleeve elements. Surrounding the sleeve elements, semi-cylindrical elements 112 and 112' are provided for attachment to one another to form cylindrical rolling module 110. The elements 112 and 112' are attached to one another using circumferential bands 104 which are intended to be wrapped and secured around the circumference of rolling module 110. The outer surface 126 of the cylindrical sleeve 120 and/or the inner surface 127 of the rolling module 110 can be formed of or coated with a low friction material to facilitate free rotation of the rolling module 110 with respect to the sleeve 120. FIG. 4B illustrates the rolling module 110 of FIG. 4A after assembly and installation on conduit 20. In the embodiment shown, a gap 106 is present between the rolling module 110 and the conduit 20 at the ends of the module because the semi-cylindrical elements 112 and 112' have a tapered inner diameter, allowing the conduit to flex and deform.

Figure 5A:
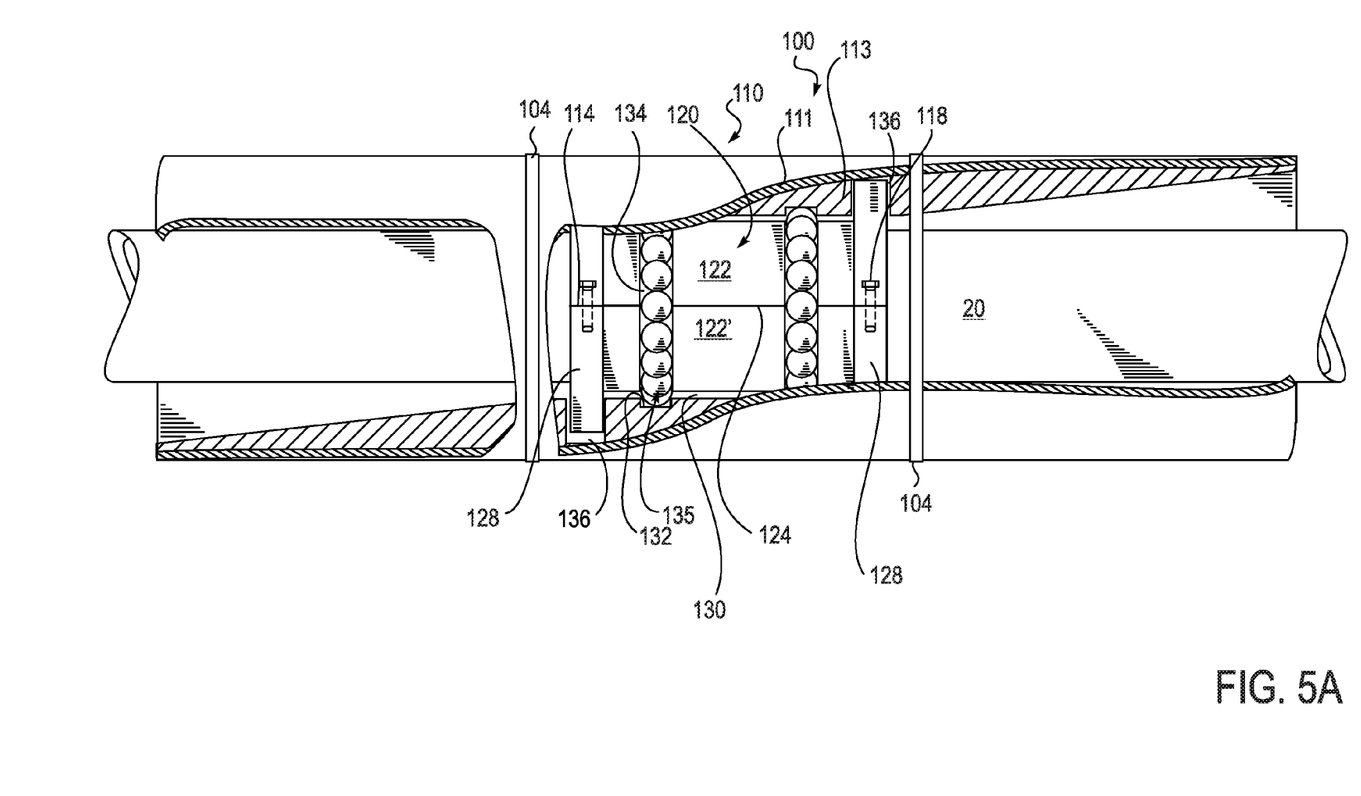
FIG. 5A-5E are cross-sectional cut-away views of rolling modules and cylindrical sleeves installed on a section of pipe according to additional alternative embodiments.

FIG. 5A illustrates an alternative embodiment of rolling assembly 100. In this embodiment, the conduit 20 is surrounded by a cylindrical sleeve 120 which is in turn surrounded by rolling module 110, as generally described previously. In the embodiment shown, the rolling module 110 includes a protective outer shell 111 surrounding the rolling module body 113. Sleeve elements 122 and 122' which make up cylindrical sleeve 120 each have a pair of channels 134. The rolling module elements which make up rolling module 110 surrounding the cylindrical sleeve have a pair of channels 132 which align in facing relation with channels 134 of the cylindrical sleeve to form a pair of races containing balls 136. The interior surfaces of the channels are optionally coated with or are formed of a low friction material to enhance free rotation of rolling module 110 with respect to sleeve 120. As shown, the rolling module 110 can be provided with a pair of channels 136 to align with flanges 128 of the sleeve 120. The flanges 128 help to prevent contamination from entering the space between the rolling module 110 and the sleeve 120.

Figure 5B:
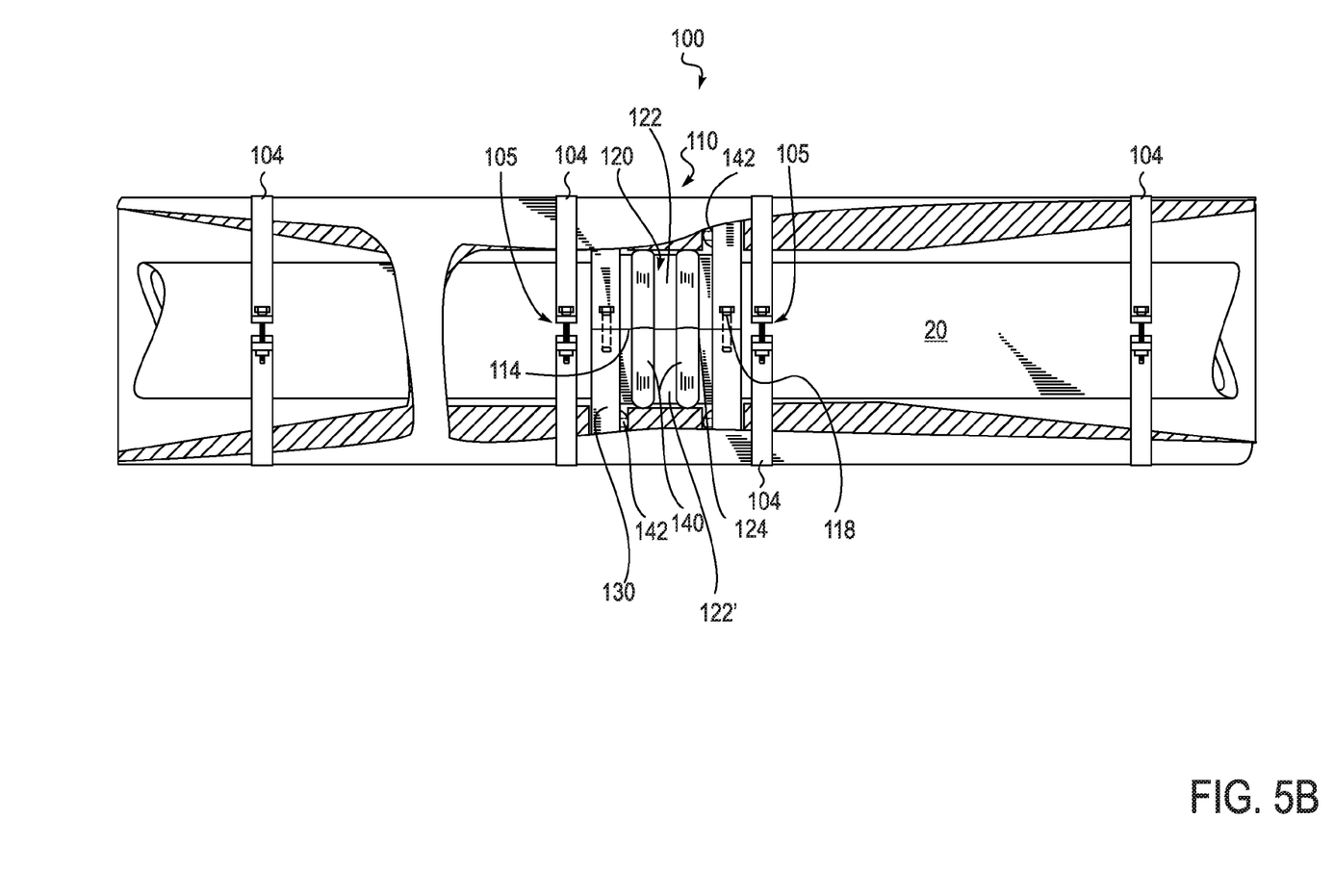

FIG. 5B illustrates yet another embodiment of rolling assembly 100. In this embodiment, the conduit 20 is again surrounded by a cylindrical sleeve 120 which is in turn surrounded by rolling module 110. As shown, the rolling module has an integral body without an outer shell. Sleeve elements 122 and 122' which make up cylindrical sleeve 120 each have a pair of raised beads 140, similar to weld beads, for establishing contact between the sleeve 120 and the rolling module 110. The beads 140 can be formed of or coated with a low friction material. In an alternative embodiment, not shown, the beads can protrude from the inner surface of the rolling module rather than from the outer surface of the cylindrical sleeve. FIG. 5B illustrates one possible exemplary means 105 for securing bands 104. Other suitable securing means will be apparent to those skilled in the art. FIG. 5B also illustrates a continuous raised bead 142 located on the flange portion of sleeve 120 for contacting an interior surface of rolling module 110. The raised bead 142 helps to prevent contamination such as dirt or sand from entering the space between the rolling module 110 and the sleeve 120.

Figure 5C:
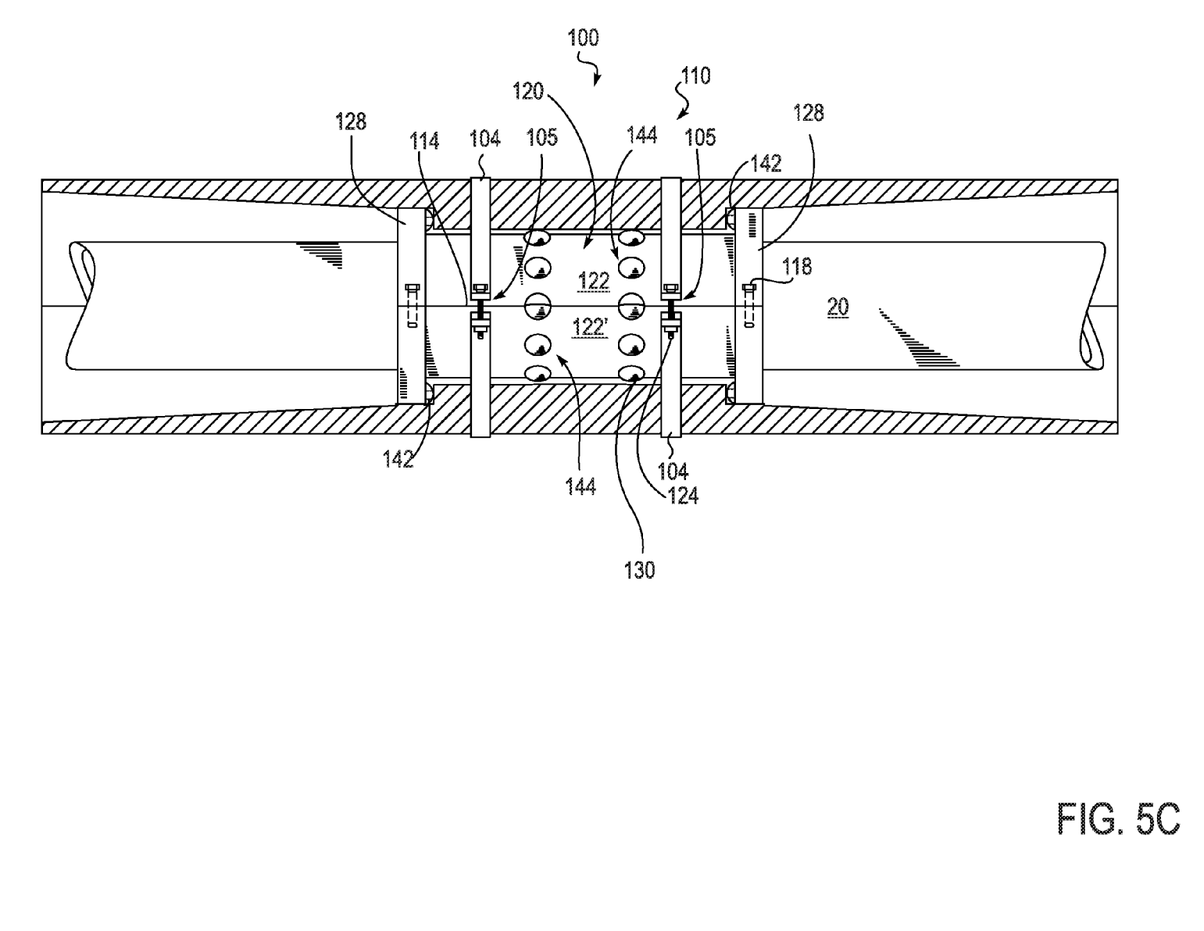

FIG. 5C illustrates yet another embodiment of rolling assembly 100, similar to FIG. 5B, differing in that a pair of series of raised nodes 144 is provided in place of raised beads 140 of FIG. 5B. By using a series of discrete nodes rather than a continuous bead, the contact area between the rolling module 110 and the sleeve 120 is reduced. Again, the nodes can be formed of or coated with a low friction material. In an alternative embodiment, not shown, the nodes can protrude from the inner surface of the rolling module 110 rather than from the outer surface of the cylindrical sleeve 120.

Figure 5D:
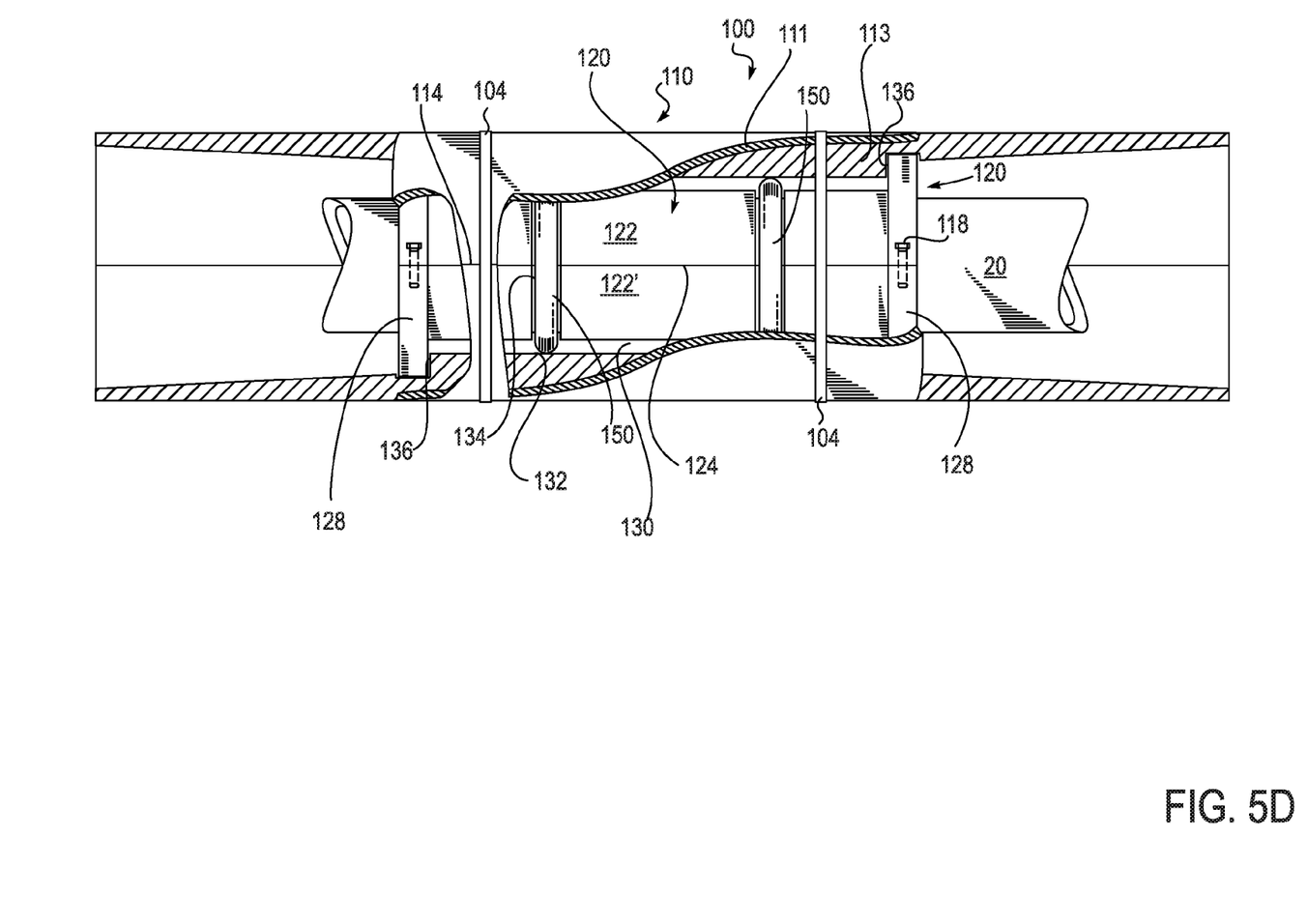

FIG. 5D illustrates yet another embodiment of rolling assembly 100. As in FIG. 5A, channels 132 and 134 are again provided in the rolling module 110 and sleeve 120, respectively. Within each race formed by the channels is provided an o-ring 150 formed of or coated with a low friction material. The inner surfaces of the channels 132 and 134 may also be formed of or coated with a low friction material.

Figure 5E:
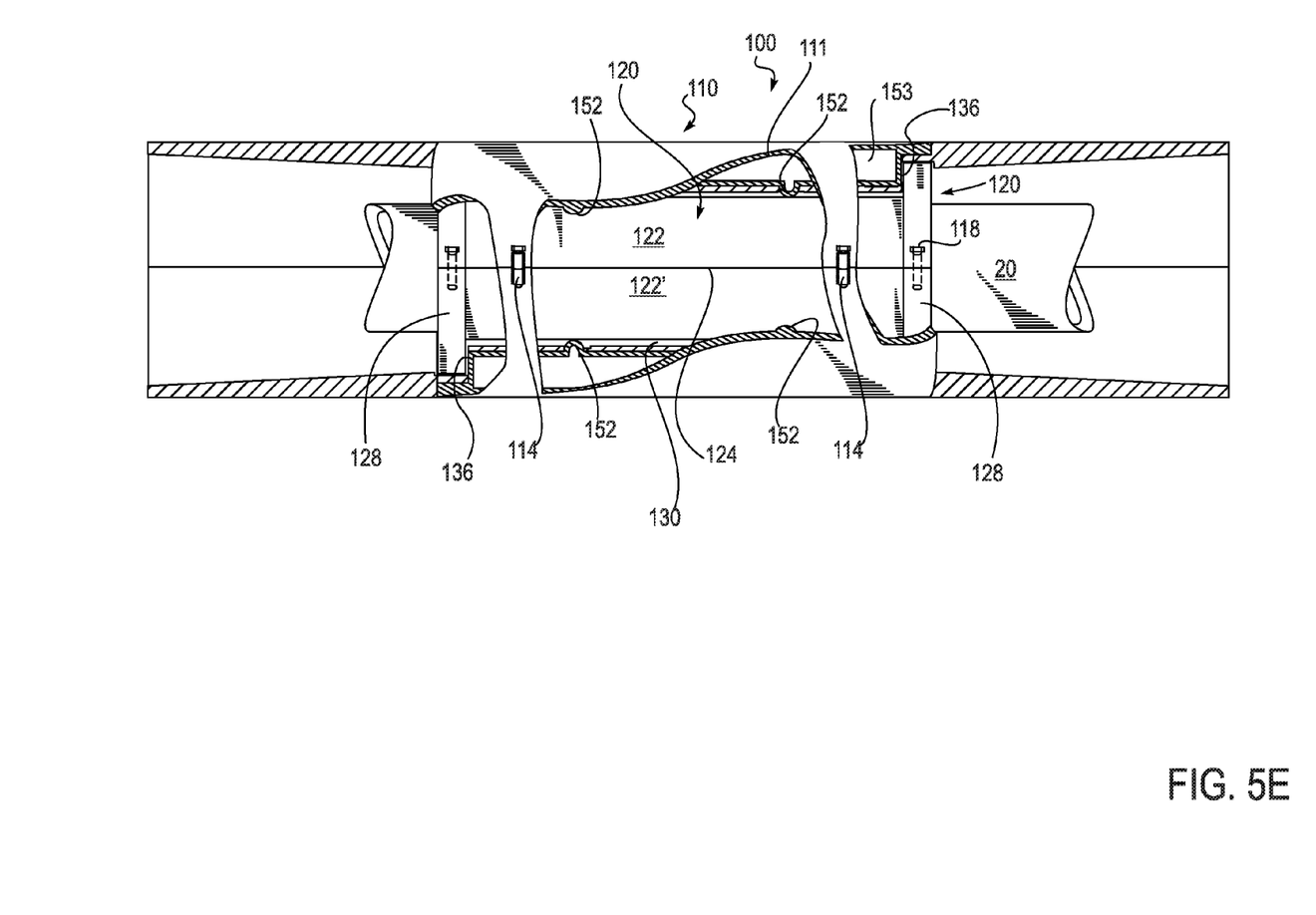

FIG. 5E illustrates yet another embodiment of rolling assembly 100. In this embodiment, rolling module 110 includes a hollow space 153 contained within a shell 111. The shell 111 includes integral raised beads 152 provided on the inner surface of rolling module 110 for contact with cylindrical sleeve 120. Beads 152 can be formed of or coated with a low friction material. Alternatively, beads 152 can be discrete nodes. FIG. 5E also illustrates an alternative means, in the form of bolts 114, for attaching the rolling module elements to one another.

Figure 5F:
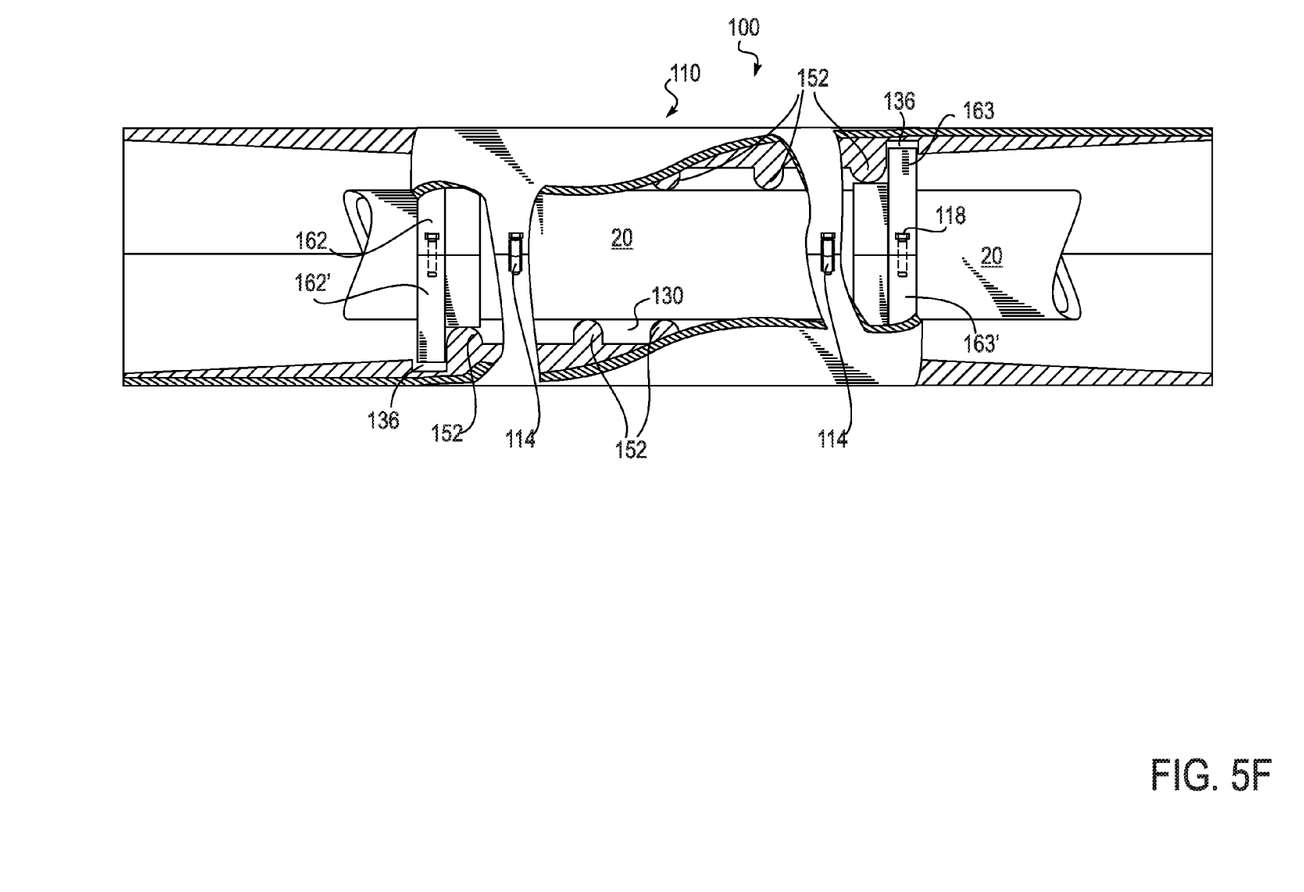
FIG. 5F-5G are cross-sectional cut-away views of rolling modules installed on a section of pipe according to additional alternative embodiments.

FIG. 5F illustrates another embodiment of rolling assembly 100, in which rolling module 110 directly contacts conduit 20, without a cylindrical sleeve as described in previous embodiments. Clamp elements 162 and 162', and 163 and 163' are attached securely to one another via bolts 118 around the conduit 20 proximate each end of the rolling module 110 to form clamps, also referred to herein as end clamps. The rolling module 110 is able to rotate with respect to conduit 20 and the clamps. The end portions of the rolling module 110 have an inner diameter such that the end portions of the rolling module contact the end clamps. In the embodiment shown, raised beads, or alternatively series of raised nodes, 152 which are integral to the rolling module 110 contact the conduit 20 as well as the clamps formed by clamp elements 162 and 162' and 163 and 163'.

Figure 5G:
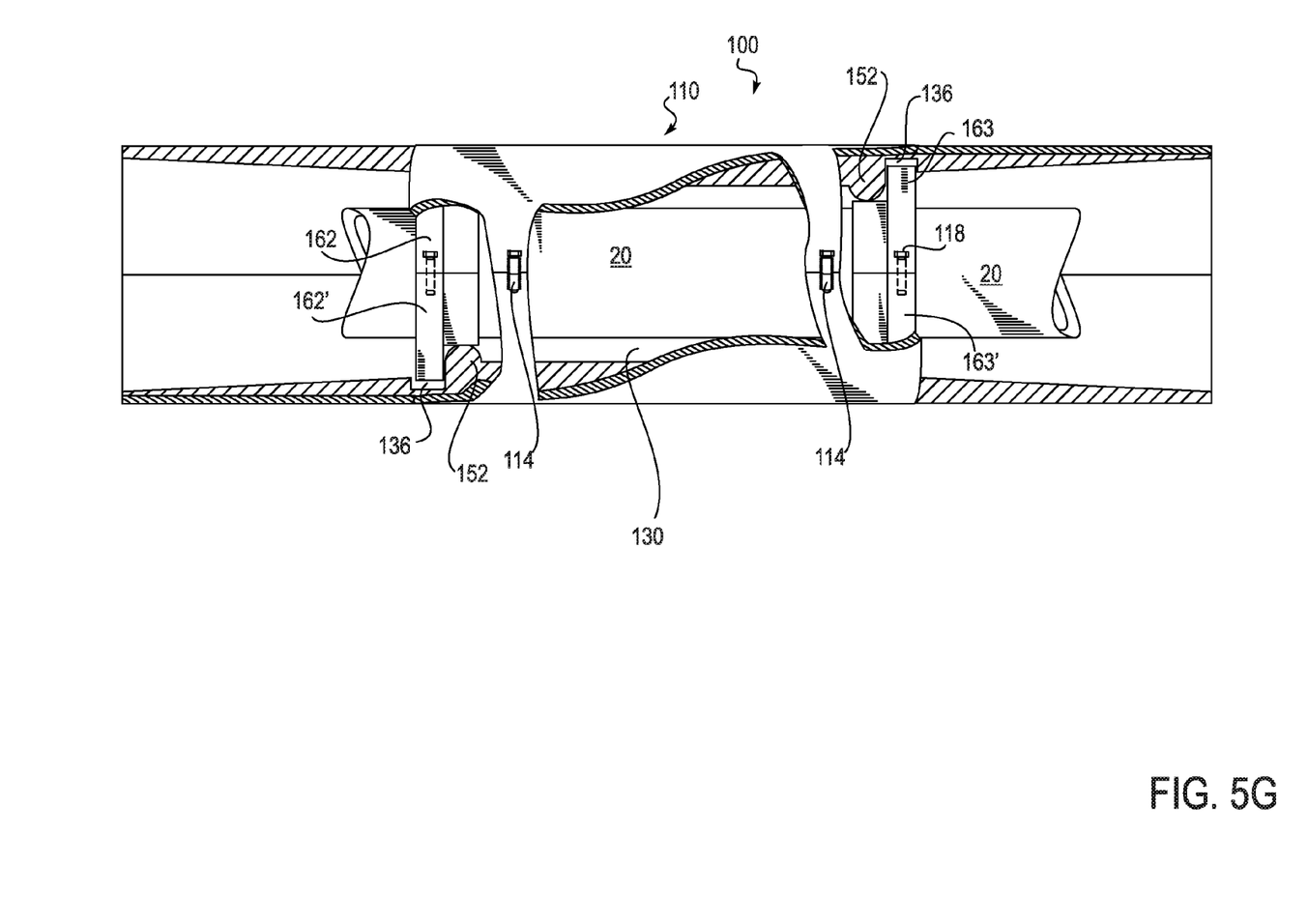

FIG. 5G illustrates another embodiment of rolling assembly 100 in which rolling module 110 is able to rotate around conduit 20, without a cylindrical sleeve there between. In this embodiment, beads (or nodes) 152 which are integral to the rolling module 110 contact the clamps formed by clamp elements 162 and 162' and 163 and 163', but no direct contact is provided between the rolling module 110 and the conduit 20. In this embodiment, beads 152 and/or retention clamp elements 162, 162', 163 and 163' may be formed of or coated with a low friction material.

Nonlimiting examples of suitable low friction materials for use on contact areas to facilitate free rotation of the rolling module with respect to the conduit in the embodiments disclosed herein include polytetrafluoroethylene (PTFE), fluorinated ethylene propylene, perfluoroalkoxy, polyethylene, silicone, modified fluoropolymer, polyetheretherketone and polyetherketone.

Figure 6:
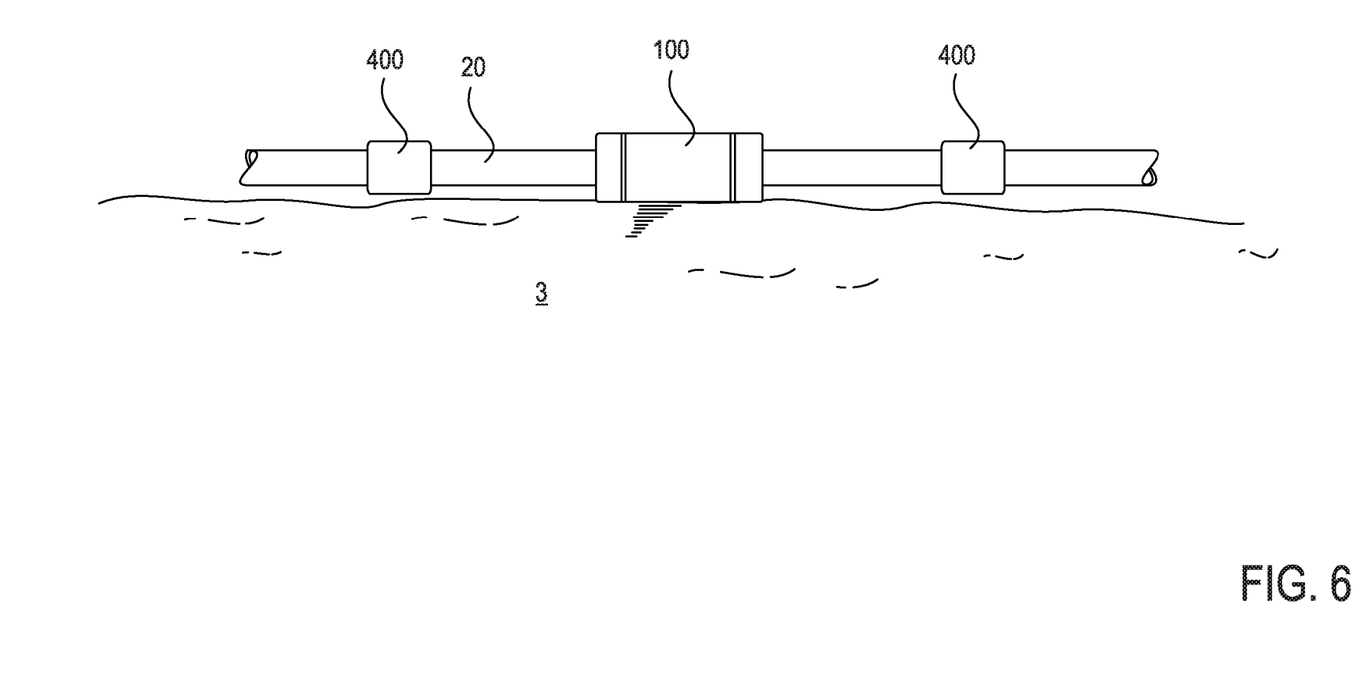
FIG. 6 is a side view of a rolling module and conventional buoyancy modules installed on a section of pipe.

In some embodiments, the rolling modules of the present disclosure can be formed of a buoyant material. Nonlimiting examples of suitable buoyant materials include foams such as polyurethane or polypropylene syntactic foam and the like. Buoyant rolling modules according to the present disclosure may also be hollow. Alternatively, the rolling modules can be formed of a non-buoyant material. In some embodiments, non-buoyant rolling modules are installed adjacent conventional buoyancy modules. As shown in FIG. 6, a pair of conventional buoyancy modules 400 are installed on pipeline 20 on either side of a non-buoyant rolling module 100 according to the present disclosure. In this embodiment, the buoyancy modules 400 do not contact the seabed 3, so that they do not interfere with the rolling of the rolling module 100 on the seabed 3.

One advantage of the systems of the present disclosure is that fewer rolling modules are necessary to deform the pipeline in a controlled manner than systems using conventional, non-rotating buoyancy modules. As a consequence, the pipeline is less susceptible to walking and therefore fewer and less expensive anchoring means for holding the pipeline in place are necessary.

In a further embodiment, a sensor to measure displacement can be located in at least one rolling module as described herein for monitoring movements of the pipeline over time. The sensor can be any suitable means for measuring, storing, and/or communicating relevant information including strains and displacement, such as, for example, a rotary encoder, a rotary variable differential transformer, an odometer or the like.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A rolling assembly for installation on a subsea conduit, the assembly comprising:
   a. At least two rolling module elements attachable to one another to form a rolling module having a cylindrical outer cross-sectional shape having two ends and defining an internal cavity for receiving a subsea conduit such that when installed on the subsea conduit the rolling module is rotatable with respect to the subsea conduit, wherein the rolling module is in direct contact with the seabed and wherein rotation of the rolling module over the seabed facilitates lateral movement of the subsea conduit; and
   b. A pair of clamp units installed on the subsea conduit proximate each end of the rolling module, each clamp unit comprising:
      i. A pair of semi-cylindrical clamp elements attachable to one another to form each clamp unit having a cylindrical outer cross-sectional shape and having a clamp interior surface for surrounding and contacting the subsea conduit such that when installed on the subsea conduit each clamp unit is fixed circumferentially and axially with respect to the subsea conduit; such that the rolling module is fixed axially with respect to the subsea conduit.

2. The rolling assembly of claim 1, wherein the internal cavity of the rolling module has an interior surface comprising raised nodes for contacting the subsea conduit.

3. The rolling assembly of claim 2, wherein the raised nodes comprise a low friction material.

4. The rolling assembly of claim 1, wherein the two ends of the rolling module elements comprise end portions adapted to extend over the pair of clamp units; and
   frictional forces between end portion interior surfaces and the pair of clamp units are sufficiently low such that the rolling module is rotatable with respect to the pair of clamp units.

5. A rolling assembly for installation on a subsea conduit, the assembly comprising:
   a. at least two sleeve elements attachable to one another to form a cylindrical sleeve having two ends and defining an internal cavity having a sleeve interior surface for surrounding a subsea conduit such that when installed on the subsea conduit the cylindrical sleeve is fixed circumferentially and axially with respect to the subsea conduit; and
   b. at least two rolling module elements attachable to one another to form a rolling module having a cylindrical shape having two ends and defining an internal cavity having a rolling module interior surface for surrounding and contacting the cylindrical sleeve such that when installed around the cylindrical sleeve the rolling module is rotatable with respect to the cylindrical sleeve and fixed axially with respect to the subsea conduit;
   wherein the rolling module is in direct contact with the seabed and wherein rotation of the rolling module over the seabed facilitates lateral movement of the subsea conduit; and
   wherein the rolling module is rotatable with respect to the subsea conduit.

6. The rolling assembly of claim 5, wherein at least one of the rolling module interior surface and the cylindrical sleeve is coated with a low friction material.

7. The rolling assembly of claim 5, wherein at least one of the rolling module interior surface and the cylindrical sleeve comprises raised nodes and the rolling module interior surface is in contact with the cylindrical sleeve at the raised nodes.

8. The rolling assembly of claim 5, wherein the cylindrical sleeve comprises at least two raised beads and the rolling module interior surface is in contact with the cylindrical sleeve at the raised beads.

9. The rolling assembly of claim 8, wherein the rolling module interior surface comprises grooves capable of mating with the raised beads.

10. The rolling assembly of claim 5, further comprising balls between the rolling module and the cylindrical sleeve, wherein the rolling module interior surface and the cylindrical sleeve each comprise at least a pair of grooves to be placed in opposing relation thereby defining at least two circumferential channels for containing the balls.

11. The rolling assembly of claim 1 or claim 5, wherein the at least two rolling module elements comprise a buoyant material.

12. The rolling assembly of claim 1 or claim 5, wherein the at least two rolling module elements comprise hollow cavities.

13. A system for conveying fluids on a seabed, the system comprising:
   a. A subsea conduit located on a seabed; and
   b. At least two rolling assemblies at least two of which are each selected from the group consisting of rolling assemblies according to claim 1, and rolling assemblies according to claim 5 installed on the subsea conduit at predetermined locations; wherein the rolling module of each of the at least two rolling assemblies is rotatable with respect to the subsea conduit.

14. The system of claim 13, wherein the at least two rolling assemblies are installed on the on the subsea conduit in sections of at least 20 adjacent rolling assemblies.

15. The system of claim 13, further comprising at least one sensor located in at least one of the at least two rolling assemblies for measuring, storing, and communicating at least one of strains and distance displaced by the subsea conduit over time.

16. The system of claim 13, further comprising buoyancy modules installed on the subsea conduit adjacent the at least two rolling assemblies.

17. The system of claim 13, wherein the fluids are well fluids from a hydrocarbon production well at a temperature between about 80° C. and about 165° C.

18. A method for controlling lateral deformation of a subsea conduit, the method comprising:
   a. Installing at least two rolling assemblies at least two of which are each selected from the group consisting of rolling assemblies according to claim 1, and rolling assemblies according to claim 5 on a subsea conduit located on a seabed at predetermined locations on the subsea conduit;
   b. Wherein the at least two rolling assemblies are rotatable with respect to the subsea conduit.

19. The method of claim 18, wherein the at least two rolling assemblies are installed on the subsea conduit by attaching the at least two rolling module elements to one another using an attachment means selected from at least one of a clamp, a circumferential band and a bolt.

20. The method of claim 18, further comprising installing buoyancy modules on the subsea conduit adjacent the at least two rolling assemblies.

21. The rolling assembly of claim 5, wherein a cylindrical gap is provided between the rolling module and the subsea conduit proximate the two ends of the rolling module to allow the subsea conduit to flex and deform.

\* \* \* \* \*